Patented Mar. 16, 1943

2,314,308

UNITED STATES PATENT OFFICE 2,314,308

UREA-ALDEHYDE ADHESIVE COMPOSITION

Carleton Ellis, Montclair, N. J.; Carleton Ellis, Jr., Bertram Ellis, and Bank of Montclair, executors of Carleton Ellis, deceased, assignors to Ellis Laboratories, Inc., a corporation of New Jersey No Drawing. Application March 16, 1940, Serial No. 324,403

6 Claims. (Cl. 260—71)

This invention relates to adhesive compositions which may be applied to sheets or strips as thin films or coatings and thereby furnish adhesive or binding agents. This invention also involves adhesive or binding compositions which are prepared from heat-hardening or thermosetting synthetic resins and which set or harden when subjected to a mild heating and pressure operation. This invention also includes adhesive compositions containing thermosetting synthetic resins and nitrohydroxy paraffins or derivatives thereof as hardening agents.

Synthetic resinous materials of the thermosetting type have been suggested previously as binding agents for the preparation of laminated objects such as those made of paper or of wood. In such instances the individual strips of paper or wood, for example, are coated or impregnated with a syrup (usually aqueous) of the resinous material and afterwards subjected to pressure to secure a binding effect between the individual strips. If desired, simultaneously with the pressing operation, heat may be applied to obtain a firmer bond between layers making up the laminated object. Disadvantages of such operation are the coated or impregnated strips must be subjected to the pressing operation almost immediately after impregnation with the syrup of resinous material, otherwise on evaporation of the solvent the resin bodies rapidly change to an infusible (and insoluble) state. When this occurs the resin is no longer applicable in the preparation of laminated objects.

If synthetic resins of the thermoplastic variety be employed, then since these resins never become permanently infusible there is always the danger that a rise in temperature will cause the resinous bond to soften. As a result the structure of the laminated object will be considerably weaker. It is not inconceivable that the laminated object may disintegrate into its individual component parts should the increase in temperature be sufficiently high and considerable stress or strain simultaneously applied.

One object of this invention is the preparation of a binding agent coated or impregnated with a thermosetting synthetic resinous body and capable of remaining in an active state for long periods of time. By the term remaining in an active state is meant that the thermosetting resin is kept, for a considerable period of time, in a state or condition on the strip or sheet whereby it has not changed to the infusible form but can be used as an adhesive agent.

Another object of this invention is the making of an adhesive or binding strip which can be employed at slightly elevated temperatures to secure an adhesive bond which is not softened or destroyed after hardening by further application of heat.

Still another object of this invention is employment of specific hardening agents for the thermosetting resins suitable for my purpose. Other objects will be apparent from the disclosures herein made.

As previously mentioned, synthetic resins of the thermosetting variety are suitable for my purpose. Examples of such resins are those made from urea or derivatives thereof and an aldehyde and those made from phenolic bodies and an aldehyde. These resinous bodies can be synthesized in any appropriate manner, the essential point being that when applied to strips of paper, for example, the synthetic resins are still in the uncured stage, i. e., they have not changed to an infusible and insoluble condition. A syrupy solution of these compounds is employed, preferably in water or other solvent which will evaporate quickly and spontaneously at room temperature and without the application of external heating. If desired, a mixture of urea (or its derivatives) and a phenolic body may be reacted with an aldehyde to furnish resinous bodies applicable to this invention.

The syrupy solution of the synthetic resinous material may be secured by effecting interaction of the resin-forming compounds in water, or other suitable solvent, and after interaction is complete then removing a sufficient portion of the reaction medium (e. g., by distillation under reduced pressure) to give a liquid solution of the desired viscosity and concentration. In other instances it may be preferable to remove substantially all of the liquid reaction medium, say, by evaporation under reduced pressure or by subjecting the liquid mass to a spray-drying operation. The substantially dry, solid materials thereby obtained afterward may be dissolved in an appropriate solvent to yield a solution of the desired concentration and viscosity.

The syrupy or viscous solution of the resinous body, after incorporation of a hardening agent which is effective at slightly elevated temperatures, is applied to the strip of paper (or other suitable material) so as to impregnate and/or coat the latter with the said solution. After evaporation of the solvent, the strip then will possess a coating or film of the thermosetting resin and the hardening agent.

Compounds such as hexamethylenetetramine and alkali metal salts of halogenated acetic acid may be employed as the hardening agents, if desired. However, the preferred agents for this invention comprise nitrohydroxy paraffins and derivatives thereof, as for example, carboxylic esters, formals and acetals. The nitrohydroxy compounds are secured by interaction of an aliphatic aldehyde and a nitroparaffin and may contain one or more hydroxyl groups per molecule. Thus, one mole of nitroethane and one mole of formaldehyde may be reacted (in the presence of a basic catalyst such as calcium hydroxide) to furnish mainly the compound 2-nitropropanol. Should a nitroglycol be desired, the molal proportion of aldehyde must be twice that of the nitroparaffin. For example, interaction of one mole of 1-nitropropane and two moles of acetaldehyde (in the presence of an alkali contact agent) gives principally the compound 3-ethyl-3-nitropentanediol-2,4. From nitromethane and an aliphatic aldehyde, when reacted in the appropriate proportions, there can be obtained a mono-, a di-, or a trihydroxy nitroparaffin.

Water serves as a convenient medium in which interaction may be effected between the aliphatic aldehyde and the nitroparaffin. As the resulting nitrohydroxy paraffin (nitroalcohol or nitroglycol) is soluble in the aqueous medium it may be separated therefrom by fractional distillation (preferably under reduced pressure), by extraction with an immiscible solvent, or by any other convenient means. Other liquid media, e. g., alcohols or esters, may be substituted for water in some cases. When the nitrohydroxy paraffin is a solid (e. g., a nitroglycol) then evaporation of the liquid reaction medium, followed by recrystallization of the residue from an appropriate solvent (for example, a mixture of ethyl acetate and chloroform) will yield a substantially pure product.

These nitroalcohols or nitroglycols in turn furnish derivatives, as mentioned above, which are suitable for my purpose. To illustrate, 2-nitro-3-hydroxypentane (from 1-nitropropane and acetaldehyde) can be treated with acetic anhydride (or other aliphatic acid anhydride) to yield the corresponding ester. Again, the nitroglycol, 2-methyl-2-nitropropanediol-1,3, can be reacted with formaldehyde in the presence of an acidic catalyst (e. g., hydrogen chloride) to furnish the corresponding formal. Acetaldehyde or other aliphatic aldehydes may be substituted for formaldehyde. These nitrohydroxy paraffins and their derivatives, regardless of whether they are liquid or solid compounds, are suitable as hardening agents for the adhesive compositions made according to my invention.

As previously stated, a resinous syrup (preferably in water) is prepared. To this is added a solution or emulsion of the hardening agent in the same liquid. After these two liquid compositions are incorporated into one another by thoroughly mixing, the resulting preparation is employed in the impregnation of paper strips and the like. The latter operation may be conducted in any suitable manner, as for example, immersing the paper strips in the resin-containing solution and then afterwards passing them between rollers whereby excess liquid is removed.

The resin-impregnated and wet strip is sprayed with a liquid which is rapidly volatile at room temperature, is miscible with the liquid employed in preparing the resin syrup, and does not dissolve the resinous binding agent. Acetone is an example of a suitable liquid. Methyl or ethyl alcohol can be substituted in many instances for acetone. Methyl ethyl ketone or methyl acetate are other illustrations of appropriate materials. Such materials being rapidly volatile at ordinary temperatures and miscible with the liquid employed in making the resin syrup will effect, therefore, quick drying of the resin-impregnated strip. Furthermore, they (the liquids) being precipitants for the resin will cause its deposition within the pores and fibers of the strip serving as the backing for the adhesive composition.

After the resin-impregnated and/or -coated strips have dried, a thin coating of wax is placed on them. This may be done by dipping the strips in a solution of wax in a volatile solvent. Spraying with such a solution is another procedure. Waxes suitable for my purpose include beeswax, ceresin, montan and paraffin waxes and the like. These need be only sufficiently soluble in the rapidly volatile organic solvents (acetone, alcohol, ketones, etc.) that after subjecting the resin-impregnated strip to a solution of wax, rapid spontaneous evaporation of the solvent will occur and the strip will be coated or covered with a thin wax film. The latter not only prevents individual strips (should they be fabricated in the form of a pad or piled one upon another) from sticking to each other but also absorption of moisture from the atmosphere.

These three effects, namely, rapid drying of the resin-impregnated strip, deposition of resin within the strip itself, and protection of the resin from moisture by means of a wax film, furnish adhesive strips (according to this invention) in which the thermosetting resin will remain in a fusible and soluble state for prolonged periods of time. In fact some strips, prepared as indicated above, have been stored for 8 to 10 weeks and at the end of this period were still active adhesive compositions.

It is possible, of course, to spray the wet resin-impregnated strip with a solution of wax in a volatile solvent. Thereby evaporation of liquids from the strip and subsequent drying thereof will be hastened and simultaneously a thin film of wax will be obtained. However, in the preferred procedure each step, i. e., drying and film-forming, is conducted in successive stages.

Another modification comprises using the same or similar volatile solvents for making the liquid syrupy composition containing a synthetic resin and for making the solution of wax. In such instances, after the paper strips are impregnated with the resinous composition they are allowed to dry by spontaneous evaporation of the solvent. No spraying, or other treatment with volatile materials is needed to secure quick drying. The strips when dry may be sprayed with or dipped into a solution of wax to secure a thin wax film over the resinous coating.

Such adhesive strips made according to this invention are useful for a variety of purposes, as for example, furnishing the adhesive bond between two sheets of paper, for mounting photographs or post cards in albums, for attaching labels to fabrics and the like. In applying such compositions for the purposes just mentioned, a convenient method of application is as follows: A strip containing the adhesive is placed between the two non-adhering surfaces and the three elements then are placed upon a hard smooth surface. A hot object, e. g., a small hand iron, is moved rapidly back and forth for a few seconds. Simultaneously, some pressure should be exerted so that the three objects are brought into close contact with each other. This procedure warms the adhesive strip thereby causing the resin to flow and form a bond with the non-impregnated and impregnated surfaces and then very quickly to change to the non-soluble and non-fusible state.

The temperature during this operation should be about 100° to 150° C. and will be determined by the type and thickness of material employed with the adhesive strip. In any event, the temperature must not be sufficiently high to cause burning, scorching or other undesirable effects. Also, in most instances the time required to secure a good binding effect will be very short, often about 3 to 5 seconds. This value, of course, may vary somewhat with the thickness, heat conductivity and other properties of the materials at hand. However, with many materials, such as post cards, photographs, etc., the time is very short and only a few seconds are required.

The following examples will illustrate my invention and how it may be carried out.

Example 1.—A syrupy liquid composition was prepared by mixing 11.4 parts of dry phenol-formaldehyde resin, 8 parts of acetone and 0.6 part of 2-nitro-2-methylpropanol. (The nitroalcohol was made by condensing equimolar proportions of 2-nitropropane and formaldehyde in the presence of a small quantity of calcium hydroxide as catalyst.) Strips of tissue paper were immersed in this syrup, then withdrawn, and the excess solution removed by scraping with the edge of a spatula.

When the strips were dry they were dipped in a saturated solution of paraffin wax in carbon tetrachloride and the latter was allowed to evaporate spontaneously at room temperature.

These strips were tested in the following manner: A resin-impregnated strip was placed between two pieces of untreated paper, placed on a hard smooth surface, and then heat and pressure applied to the mass for a few seconds with the aid of a hot iron. After allowing the mass to cool for about 30 seconds, a bond was formed between each of the outer sheets and the interposed resin-impregnated strip. Also, the pieces of paper could not be pulled away from one another without tearing or splitting.

Example 2.—A syrupy liquid composition was prepared having the following proportion of ingredients:

| | Parts |
|---|---|
| Dry phenol-formaldehyde resin | 8 |
| Acetone | 8 |
| Acetal of 2-nitro-2-ethylpropanediol-1,3 | 0.4 |

The acetal was made in the following manner: 1-nitropropane and formaldehyde, in the ratio of 1 mole of the former to 2 moles of the latter, were reacted using calcium hydroxide as a catalyst. The resulting nitroglycol (i. e., 2-nitro-2-ethylpropanediol-1,3) was treated with acetaldehyde, employing hydrogen chloride as a catalyst.

Strips of paper were impregnated with the syrupy composition, dried, then coated with paraffin wax, as described in Example 1.

Tests with these papers were made in the manner indicated in Example 1. It was found in this instance also that a secure and firm bond was obtained after the heating and pressing operation and then allowing the test pieces to cool for about 30 seconds.

Example 3.—The syrupy solution in this instance contained the following proportion of ingredients:

| | Parts |
|---|---|
| Phenol-formaldehyde resin | 5.7 |
| Acetone | 5.7 |
| Formal of 2-nitropropanol | 0.2 |

Preparation of the formal of 2-nitropropanol comprised the following steps: nitroethane and formaldehyde in equimolar proportions were condensed in the presence of a small quantity of alkali. The resulting nitroalcohol, 2-nitropropanol afterwards was reacted with an equivalent proportion of paraform, using hydrogen chloride as the catalyst.

Strips of paper were impregnated with this syrup, dried, and then coated with a thin film of paraffin wax, as described in Example 1. When these strips were tested as adhesive compositions, as in Example 1, it was found they gave very good binding action.

Example 4.—A syrupy liquid composition was prepared by dissolving 25 parts of dry urea-formaldehyde resin in 25 parts of water and then incorporating 1.2 parts of 2-nitro-2-methylpropanol. Strips of tissue paper were dipped in the above solution, withdrawn, and the excess solution gently scraped off with a spatula. The strips were immediately sprayed with acetone to hasten evaporation of the water. When dry, the strips were dipped in a saturated solution of paraffin wax in carbon tetrachloride and the latter allowed to evaporate at room temperature.

Adhesive strips prepared in this manner were treated as in Example 1. It was noted that not only were good bonds obtained, but that the bond held firmly even while hot, thus eliminating the necessity of a short cooling period.

Example 5.—A syrupy liquid was prepared which contained the following ingredients:

| | Parts |
|---|---|
| Dried urea-formaldehyde resin | 12.5 |
| Water | 12.5 |
| The acetal of 2-nitro-2-ethylpropanediol-1,3 | 0.5 |

After the above materials were incorporated by thoroughly mixing, strips of tissue paper were immersed therein, withdrawn, excess liquid removed by gently scraping with a spatula, and finally the strips were sprayed with acetone to effect quick evaporation of water. Afterwards the dried resin-impregnated strips were dipped in a saturated solution of wax in carbon tetrachloride. Evaporation of the latter at room temperature yielded wax-coated strips.

These strips furnished tight, secure bonds when subjected to a heating and pressing operation as described in Example 1.

Example 6.—Adhesive strips were prepared from highly absorbent paper by immersing the latter in a liquid composition consisting of 75 parts of dried urea-formaldehyde resin, 75 parts of water, and 4.5 parts of 2-nitro-2-methylpropanediol-1,3; then passing the paper strips through squeeze rolls to remove excess liquid; spraying the strips with acetone; allowing them to dry; and finally coating them with a thin film of wax by immersion in a carbon tetrachloride solution of paraffin, withdrawing and permitting the tetrachloride to evaporate spontaneously.

The nitroglycol, 2-nitro-2-methylpropanediol-1,3, was made by condensation of 1 mole of nitroethane with 2 moles of formaldehyde, using a small quantity of alkali as the catalyst.

*Example 7.*—Another liquid composition applicable for the preparation of adhesive strips contained the following ingredients.

| | Parts |
|---|---|
| Dried urea-formaldehyde resin | 75 |
| Water | 75 |
| 2-nitro-2-methylpropanediol-1,3 | 3 |
| Gum arabic | 2 |

Strips of absorbent paper were immersed in this liquid composition and then run through squeeze rolls. Afterwards they were sprayed, dried and coated with a film of wax as described in Example 6.

*Example 8.*—An adhesive composition containing the following ingredients was prepared:

| | Parts |
|---|---|
| Dried urea-formaldehyde resin | 75 |
| Water | 50 |
| 2-nitrobutyl acetate | 4.5 |

One side of a sheet of absorbent paper was painted with sufficient quantity of the above adhesive composition to secure a thin film. The painted side then was sprayed with acetone and allowed to dry. Afterwards, this same side was painted with a solution of paraffin wax in carbon tetrachloride and on spontaneous evaporation of the latter, a thin, adhering film of wax was secured.

The nitrobutyl acetate was prepared in the following manner: 1-nitropropane was reacted with formaldehyde, in the presence of an alkali, to furnish 2-nitrobutanol. This nitrohydroxy paraffin then was treated with acetic anhydride to yield the corresponding acetate.

The dried adhesive strip was placed on a small block of wood with the resin-coated side next to the wood. A heated iron was rubbed by hand over the paper for a few seconds, some pressure being exerted simultaneously with the heating operation. An excellent bond between the paper and wood was secured.

*Example 9.*—Another portion of the paper, as prepared in Example 8, was placed on a piece of cotton fabric, the resin-coated side being in contact with the fabric. After subjecting the paper to a mild heating and pressure operation, it was noted that a good bond was secured between the paper and fabric. This bond, however, was not permanent, as in the case of paper to paper. However, it would serve in cases where labels were to be attached to fabrics and then later removed, as both of these steps could be effected without damage to the fabric.

*Example 10.*—One side of a block of white pine was painted with the syrupy composition as prepared in Example 8. The resinous film on the wood then was sprayed with acetone and permitted to dry (by evaporation of the liquids) at room temperature. When dry, the resin-coated side of the wood block was immersed in a saturated solution of paraffin wax in carbon tetrachloride, withdrawn, and allowed to dry at room temperature.

When an untreated (i. e., not resin-coated) piece of paper was placed on this block in contact with the adhesive film and a hot hand iron was applied for a few seconds to the outer surface of the untreated paper, an excellent bond was effected between the paper and wood. This bond could not be broken by pulling the paper from the wood; instead the paper split and tore.

From the foregoing disclosure it will be seen that this invention comprises an adhesive composition consisting of a thermosetting synthetic resin which is in the fusible state and a hardening agent therefor. The latter includes various nitro-alcohols, nitroglycols or other polyhydroxy nitroparaffins, aliphatic carboxylic esters thereof, and 1,1-di(nitroalkoxy)alkanes made by the interaction of a nitrohydroxy paraffin (nitroalcohol or polyhydroxy nitroparaffin) with an aliphatic aldehyde. Such adhesive compositions when spread as a thin film on a suitable backing such as paper, wood, etc., and coated with a thin film of wax furnishes a bonding and/or adhesive agent suitable for many purposes. Furthermore, such agents retain their adhesive or binding properties for an indeterminate time, as for example, several weeks or months, or more. In effecting adhesion between the binding agent and other suitable material, it is necessary to subject these two components in contact with one another to a mild heating and pressure operation.

What I claim is:

1. A heat-hardening adhesive composition which comprises a thermo-setting resin derived from urea and an acyclic aldehyde and a hardening agent therefor selected from the group consisting of nitrohydroxy paraffins derived from a nitroparaffin and an acyclic aldehyde, said composition being substantially a dry solid and covered with a coating of wax and being capable of conversion to an infusible state when spread in a thin film and subjected to the action of mild heating and pressure.

2. A heat-hardening adhesive composition which comprises a thermo-setting resin derived from urea and formaldehyde and a hardening agent therefor selected from the group consisting of nitrohydroxy paraffins derived from a nitroparaffin and an acyclic aldehyde, said composition being substantially a dry solid and covered with a coating of wax and being capable of conversion to an infusible state when spread in a thin film and subjected to the action of mild heating and pressure.

3. A heat-hardening adhesive composition which comprises a thermo-setting resin derived from urea and formaldehyde and a hardening agent therefor selected from the group consisting of nitroalcohols derived from a nitroparaffin and an acyclic aldehyde, said composition being substantially a dry solid and covered with a coating of wax and being capable of conversion to an infusible state when spread in a thin film and subjected to the action of mild heating and pressure.

4. A heat-hardening adhesive composition which comprises a thermo-setting resin derived from urea and formaldehyde and a hardening agent therefor selected from the group consisting of nitroglycols derived from a nitroparaffin and an acyclic aldehyde, said composition being substantially a dry solid and covered with a coating of wax and being capable of conversion to an infusible state when spread in a thin film and subjected to the action of mild heating and pressure.

5. A heat-hardening adhesive composition, according to claim 3, in which the hardening agent is a nitrohydroxy paraffin derived from a nitroparaffin and formaldehyde.

6. A heat-hardening adhesive composition, according to claim 3, in which the hardening agent is a nitrohydroxy paraffin derived from a nitroparaffin and acetaldehyde.

CARLETON ELLIS.